Patented Mar. 9, 1926.

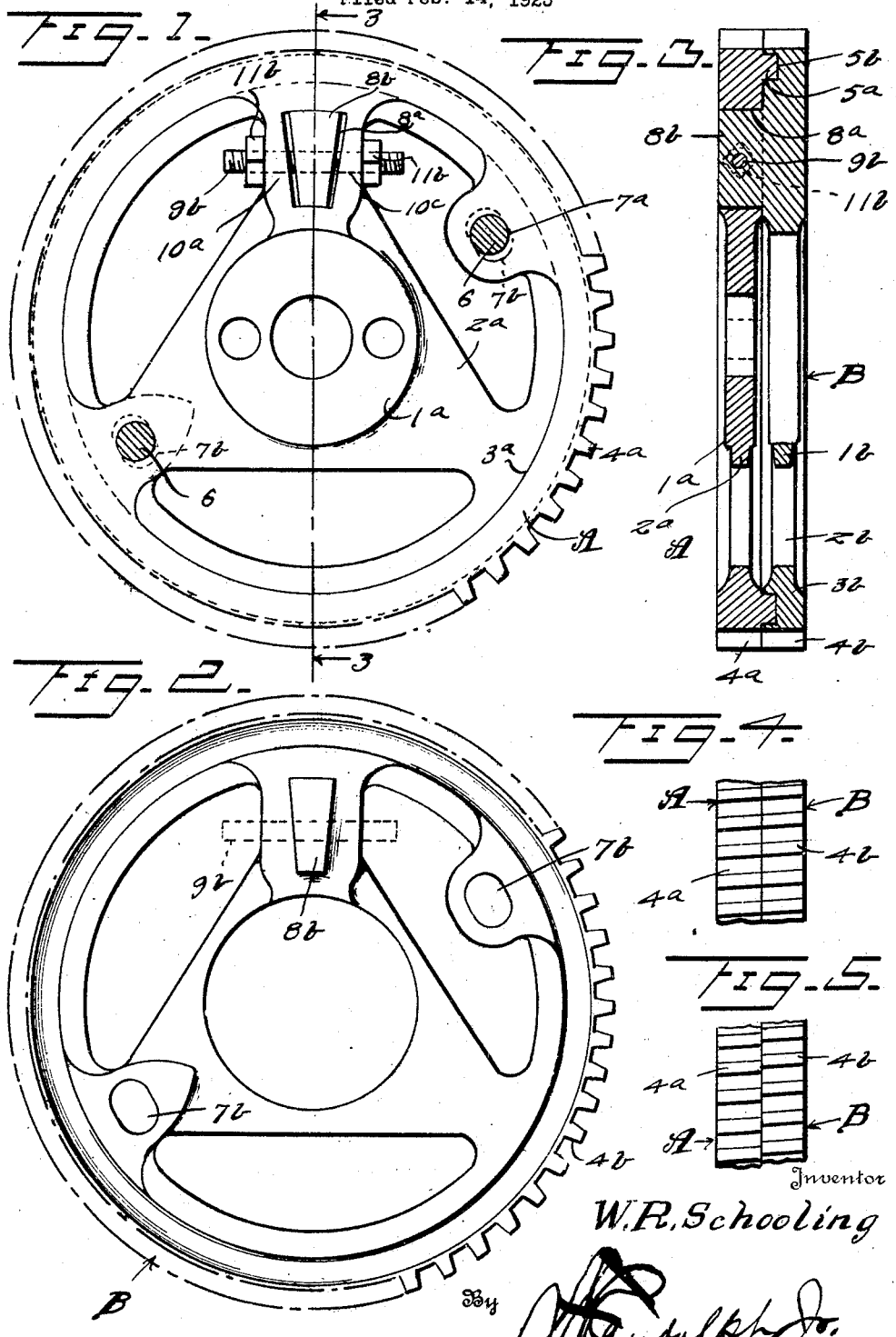

1,576,369

UNITED STATES PATENT OFFICE.

WALTER RAY SCHOOLING, OF STANDARD, ALBERTA, CANADA.

ADJUSTABLE GEAR WHEEL.

Application filed February 14, 1925. Serial No. 9,233.

*To all whom it may concern:*

Be it known that I, WALTER R. SCHOOLING, citizen of United States, residing at Standard, in the Province of Alberta and Dominion of Canada, have invented certain new and useful Improvements in Adjustable Gear Wheels; and I do hereby declare the following to be a full, clear, and exact description of the invention, such as will enable others skilled in the art to which it appertains to make and use the same.

This invention relates to gear wheels, and has for one of its objects the provision of a novel and simple device of this character which will operate silently under any condition of wear of the working sides of its teeth, and to attain this end I provide a gear wheel which shall embody substantially similar units provided with teeth and adjustably connected together, and means by which the units may be readily adjusted to take up the wear of the working sides of the teeth and secure them in adjusted positions against any relative movement.

With the above and other objects in view, the invention consists of the construction, combination and arrangement of parts hereinafter described and claimed, and illustrated in the accompanying drawing, wherein:

Figure 1 is an elevational view of a gear wheel constructed in accordance with my invention, Figure 2 is a similar view of one of the units of the gear wheel, Figure 3 is a sectional view taken on the plane indicated by the line 3—3 of Figure 1, Figure 4 is a plan view of a fragmentary portion of the edges of the gear units, illustrating the relative position of the teeth of the units before any wear has occurred in the working sides of the teeth, and Figure 5 is a view similar to Figure 4 illustrating the relative position of the teeth of the gear units after the units have been adjusted to take up the wear of the working sides of the teeth.

Referring to the drawing by reference characters, A designates one, and B the other unit of the gear wheel. The gear unit A comprises a hub $1^a$, a web $2^a$, a rim $3^a$, and teeth $4^a$. The gear unit B comprises similar parts, and these parts are designated $1^b$, $2^b$, $3^b$ and $4^b$, respectively. The gear unit A is provided at its inner side with an annular rib $5^a$ which fits in an annular groove $5^b$ in the inner side of the gear unit B and functions to prevent the gear unit from having any relative radial movement. The gear units A and B are prevented from having any relative lateral movements by bolts 6 which have a snug fit in openings $7^a$ in the gear unit A and a loose fit in openings $7^b$ in the gear unit B, the openings $7^b$ being elongated to permit one unit to be rotated in either direction with respect to the other when it is necessary to adjust the teeth $4^a$ and $4^b$ relatively to take up any wear of the working faces thereof. The gear unit B is provided with a lug $8^b$ fitting in an opening $8^a$ in the gear unit A. The sides of the lug $8^b$ and the side walls of the opening $8^a$ respectively incline inwardly in the direction of each other, and the transverse extent of the lug $8^b$ is less than the similar dimension of the opening $8^a$ so as to permit the gear units A and B to be adjusted as aforesaid. A bolt $9^a$ which is carried by and fixed to the lug $8^b$ extends loosely through openings $10^a$ in the gear unit A. The side edges of the web $2^a$ adjacent the opening $8^a$ are flat and parallel to provide bearing surfaces for nuts $11^b$ carried by the projecting ends of the bolt $9^b$. These nuts and the bolts 6 are adapted to hold the gear units A and B against any relative rotary movement.

From the foregoing description, taken in connection with the accompanying drawing, it should be apparent that the gear units A and B may be adjusted relatively in a manner to take up wear of the working sides of the teeth $4^a$ and $4^b$. When it is desired to adjust the gear units A and B, the bolts 6 are first loosened and thence one of the nuts $11^b$ is advanced upon the bolt $9^b$ and the other nut simultaneously and to the same degree back off of the bolt. This will impart a relative rotary movement of one of the gear units with respect to the other due to the fact that the bolt $9^b$ is carried by one unit and the nut being advanced contacts with the other. This adjustment so alters the relative position of the teeth $4^a$ and $4^b$ as to compensate for the wear of the working sides thereof. The gear units A and B are locked in their adjusted positions by tightening up the bolts 6.

From the foregoing description, taken in connection with the accompanying drawing, the advantages of the construction and of the method of operation will be readily apparent to those skilled in the art to which the invention appertains. While I have described the principle of operation of the invention, together with the device which I now consider to be the best embodiment thereof, I desire to have it understood that the device shown is merely illustrative and that such changes may be made when desired as are within the scope of the invention as claimed.

What is claimed is:

1. A gear wheel comprising substantially similar units connected for relative rotary adjustment and provided with teeth, one of the units having an opening and the other a lug entering said opening, a bolt carried by the lug, and nuts mounted on the bolt and contacting with the unit provided with the opening.

2. A gear wheel comprising substantially similar units connected for relative rotary adjustment and provided with teeth, one of the units having an opening, the side walls of which incline inwardly in the direction of each other, a lug carried by the other unit and fitting in said opening, the lug having its lateral sides inclined inwardly in the direction of each other and having a transverse dimension less than the similar dimension of the opening, a bolt carried by the lug and loosely engaging the unit provided with the opening, and nuts carried by the bolt and contacting with said last named unit.

3. A gear wheel comprising substantially similar units provided with teeth, one of the units having an annular groove and the other an annular flange fitting in the groove and one of the units having an opening and the other a lug fitting in said opening, a bolt carried by the lug and loosely engaging the unit provided with the opening, nuts mounted upon the bolt and contacting with said last named unit, and other bolts engaging with the units.

In testimony whereof I affix my signature.

WALTER RAY SCHOOLING.